Feb. 22, 1944.  L. J. DUFFY  2,342,256

STEAM ENGINE

Filed July 2, 1942  2 Sheets-Sheet 1

Inventor
LESLIE J. DUFFY
By J. Mothershead
Attorney

Feb. 22, 1944.   L. J. DUFFY   2,342,256
STEAM ENGINE
Filed July 2, 1942   2 Sheets-Sheet 2

Inventor
LESLIE J. DUFFY
By J. Mothershead
Attorney

Patented Feb. 22, 1944

2,342,256

UNITED STATES PATENT OFFICE 2,342,256

STEAM ENGINE

Leslie J. Duffy, Washington, D. C.

Application July 2, 1942, Serial No. 449,455

6 Claims. (Cl. 121—124)

(Granted under the act of March 3, 1883, as amended April 30, 1928; 370 O. G. 757)

This invention relates to reciprocating engines of the kind using an elastic motive fluid, such as steam. The invention pertains particularly to steam engines and to engine cylinders as well as to the relative arrangement and mode of operation of parts cooperating therewith.

The purposes of the invention are to improve the efficiency of engines of the class described; to provide for increasing the power of engines of the class described by considerably reducing, if not entirely eliminating, the back pressure on the return stroke of the piston; to provide for exhausting motive fluid from substantially the entire cylinder substantially instantaneously upon the completion of the working stroke; to provide an engine of the class described having exhaust ports of considerable area disposed along the cylinder for substantially the full stroke of the piston so that these ports may be opened preferably at about the end of the working stroke for immediately exhausting motive fluid from all portions of the cylinder; to provide an engine having these advantageous features and also having admission ports which may be controlled for admitting motive fluid for any desired portions of the stroke by any suitable steam engine valve gear; and also to provide for improving the construction and relative arrangement of parts of an engine of the class described.

The features of the invention are illustrated in the accompanying drawings, wherein.

Figure 1:
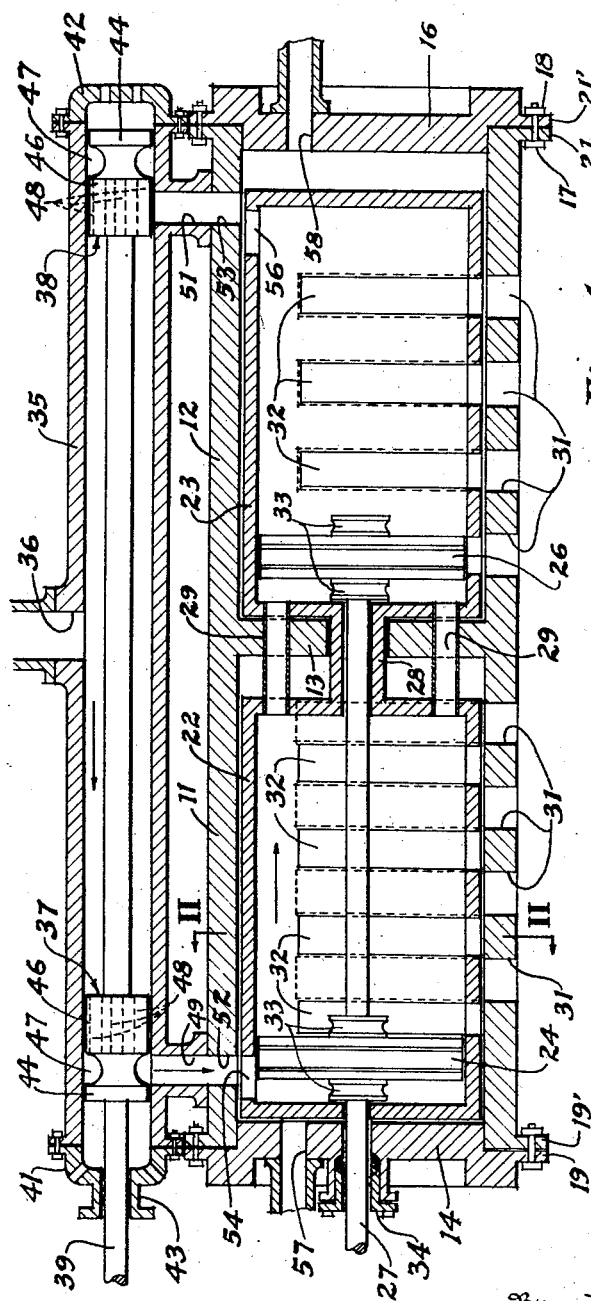
Fig. 1 is a longitudinal section through an engine having single acting cylinders equipped with sleeve valves for controlling the exhaust ports and having independently operable valve means for controlling the admission ports.
Figure 2:
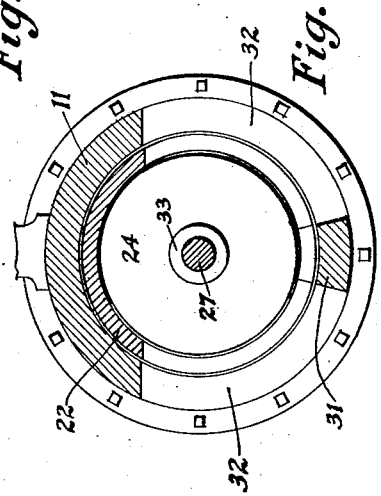
Fig. 2 is a section on the line II—II of Fig. 1.

The embodiment selected for illustration comprises aligned cylinders 11 and 12, which may be of unitary construction, as shown, and provided with a common intermediate head 13 at their adjacent inner ends and with heads 14 and 16 which may be secured to the outer ends of these cylinders in any suitable manner, as by means of attaching elements, such as bolts 17 and nuts 18, mounted in mating flanges 19, 19' and 21, 21' carried respectively by the heads and by the cylinders. Sleeves or cylindrical slide valves 22 and 23 may be slidably mounted in these cylinders for longitudinal movement relative thereto. Pistons 24 and 26 may be mounted on a common piston rod 27 and disposed within the slide valves to make a working fit therewith. Preferably, these slide valves are in the form of hollow cylinders having closed ends and are connected for unitary movement, as by means of a cylindrical member 28 extending slidably through a suitable opening in intermediate head 13 and connecting the adjacent end walls of the slide valves. Preferably, the cylindrical connecting member 28 fits slidably on piston rod 27 for longitudinal movement relative thereto. A suitable number of conduits 29 may be mounted in the adjacent end walls of the slide valves to provide for substantially free and unrestricted passage between the slide valves of gaseous media, such as air, or air and steam. Preferably, conduits 29 extend slidably through suitable openings in intermediate head 13.

Preferably, each of the cylinders is provided substantially throughout the length thereof with a series of longitudinally spaced and circumferentially extending ports 31 and the slide valves are provided with similarly arranged, cooperating ports 32. Preferably, these ports represent a relatively large proportion of the total area of the side wall of each cylinder, as shown, so that immediately upon opening these ports the expanded motive fluid, such as steam, is exhausted therethrough to atmosphere and in this way, back pressure on the return stroke is substantially eliminated.

In order that the slide valves may be operated automatically to open all the exhaust ports 32 in each cylinder as the piston therein reaches the end of its working stroke, each of the slide valves may be made somewhat shorter than the cylinder in which it is mounted so as to be capable of sufficient longitudinal movement therein to provide for opening and closing the ports 32 thereof. Suitable bumpers 33 may be mounted on the piston rod on each side of each piston for engagement with the opposed end wall of each slide valve as the piston approaches the end of its stroke in either direction. Conveniently, these bumpers may be in the form of collars threaded or otherwise mounted on the piston rod for longitudinal adjustment therealong. Cylinder head 14 may be equipped with a stuffing box 34 for the piston rod.

For supplying motive fluid for operating the pistons, there may be provided a valve chest in the form of a cylinder 35 having an inlet 36 and fitted with valve spools 37 and 38 mounted on a valve rod 39. The cylinder 35 may be fitted with ported heads 41 and 42 to avoid air pocketing, and head 41 may be provided with a bearing 43 for the valve rod. Each of the valve spools may comprise spaced cylindrical portions 44 and 46, making a working fit with the cylinder, and an intermediate portion 47 of reduced cross sectional area. The cylindrical portions 46 may be formed with longitudinal passages 48 extending therethrough for conducting motive fluid to the annular space about reduced intermediate portion 47. The valve chest may be provided with ports 49 and 51, positioned to be controlled by the valve spools, for conducting motive fluid into the slide valves through cylinder ports 52 and 53 and through longitudinal slots 54 and 56 in the upper walls of the slide valves.

In this engine, various means may be employed to shift the position of the sleeve-valve 22—23. A means for suddenly admitting steam may be a manually controlled valve (not shown) in the pipe 57. The closed end of the sleeve-valve 22 has a greater area than the piston 24, so that there would be an unbalanced force to shift the sleeve-valve, even though steam under equal pressure is being admitted within the sleeve-valve. Similarly, the sleeve-valves may be shifted in the opposite direction by unbalanced steam pressure admitted through the port 58. After these sleeve-valves 22—23 have been shifted, the supply of steam through the port 58 must be stopped, as by closing a manually operated valve, not shown.

In the operation of this engine, any of the usual valve gears may be used for controlling the operation of valve rod 39. Each of the working pistons is single acting and each performs its working stroke in a direction opposite to that of the other. With the parts arranged as shown in Fig. 1, motive fluid, such as steam, is supplied to the steam chest through inlet 36 thereof. Steam passes to the valve spools and through the passages 48 to the annular spaces about the reduced portions 47. As port 51 is closed by cylindrical portion 46 of spool 38, no steam is admitted to working cylinder 12. However, valve spool 37 is so positioned that reduced portion 47 thereof overlies port 49 and therefore, steam passes through this port and port 52 and slot 54 into slide valve 22 to the crank end of piston 24. This causes piston 24 to travel to the right on its working stroke. It will be noted that the slide valves are so positioned that exhaust ports 31 of cylinder 11 are closed while exhaust ports 31 of cylinder 12 are open and therefore, piston 26, which moves with piston 24, merely travels idly on its return stroke. As piston 24 advances on its working stroke, any gaseous media, such as air or steam, on the non-working side of piston 24 is displaced through conduits 29 into slide valve 23 and through open ports 31 of cylinder 12 to atmosphere.

Figure 3:
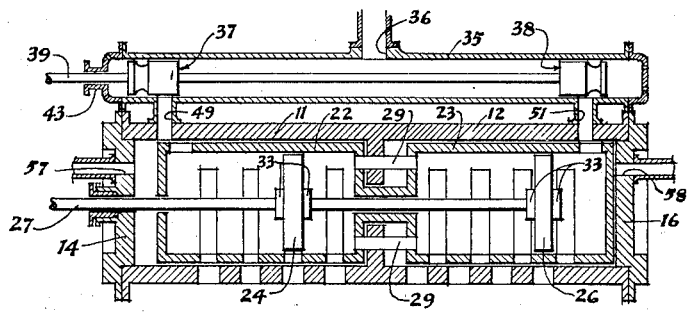
Fig. 3 is a view similar to Fig. 1, but to a reduced scale and showing the parts in different relative positions for operation of the engine in the same direction as in Fig. 1.

As piston 24 approaches the end of its working stroke, bumper 33 on the right side thereof engages the right end wall of slide valve 22 and moves this slide valve to the right, and thereby opens exhaust ports 31 of cylinder 11 and thus, the steam is immediately exhausted from this cylinder upon the completion of the working stroke of piston 24. Preferably, bumper 33 on the right side of piston 26 engages the right end wall of slide valve 23 to move it to the right to close exhaust ports 31 of cylinder 12 substantially as ports 31 of cylinder 11 are opened. It will also be understood that valve rod 39 is operated in properly timed relation by a suitable valve gear (not shown) to shift the valve spools, thereby closing port 49 and opening 51 so that steam is admitted through port 53 and slot 56 to the head end of piston 26, which then advances to the left on its working stroke. As this piston approaches the end of its working stroke, bumpers 33 on the left sides of pistons 24 and 26 engage the end walls of the slide valves associated therewith, thereby opening exhaust ports 31 of cylinder 12 and closing exhaust ports 31 of cylinder 11. It will also be understood that as valve rod 39 is continuously controlled by a suitable valve gear (not shown), the valves are adjusted to some desired position, such as that shown in Fig. 1. Fig. 3 illustrates one of the relative positions of the parts, as just described, with piston 26 advancing to the left on its working stroke and piston 24 moving idly to the left on its return stroke.

Figure 4:
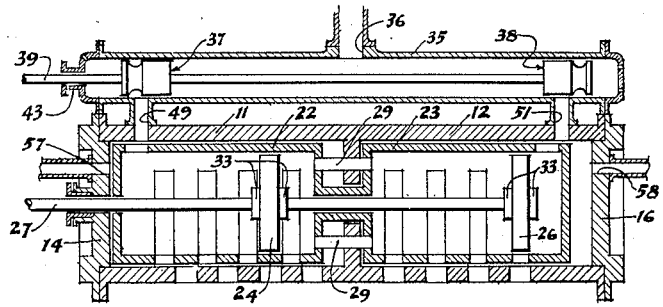
Figs. 4 and 5 are views similar to Fig. 3, showing the parts in different relative positions for operation of the engine in a direction reverse to that shown in Figs. 1 and 3.
Figure 5:
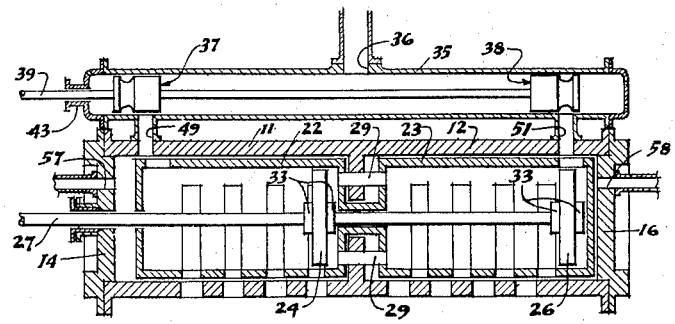

The position of sleeve valves 22 and 23 may be reversed, preferably by admitting a pressure fluid such as air or steam through an appropriate hand operated valve to one of ports 57 or 58 against the outer end wall of the adjacent sleeve valve which has a greater area than the pistons so as to move both of these sleeve valves and thus reverse the position of these valves with respect to the exhaust ports in cylinders 11 and 12. For instance, the engine with its parts in the positions shown in Fig. 3, may be reversed as just described by adjusting the valve gear and admitting pressure fluid through port 58 against the adjacent end wall of slide valve 23, thereby displacing both slide valves 22 and 23 to the left and reversing the positions of these slide valves with respect to exhaust ports 31 in cylinders 11 and 12 as shown in Fig. 4. As the engine with its parts arranged as shown in Fig. 4 operates in reverse, piston 24 becomes the working piston and as it moves to the right and completes its working stroke, bumpers 33 engage and move slide valves 22 and 23 to the right (Fig. 5), whereupon piston 26 becomes the working piston and starts its working stroke as previously described herein.

The invention described herein, if patented, may be manufactured and used by or for the Government for governmental purposes without the payment to me of any royalty thereon.

It should be understood that the present disclosure is for the purposes of illustration only, and that the invention includes all modifications and equivalents which fall within the scope of the appended claims.

I claim as my invention and desire to secure by my patent:

1. The combination of a cylinder having a series of circumferentially extending exhaust parts spaced longitudinally therealong, a sleeve valve slidable within said cylinder for opening and closing said exhaust ports, a piston reciprocable in said sleeve valve, means for admitting motive fluid for operating said piston, and means effective toward the end of the working stroke of said piston for moving said sleeve to open said exhaust ports.

2. The combination of a cylinder having a series of circumferentially extending exhaust ports spaced longitudinally therealong, a sleeve valve slidable within said cylinder for opening and closing said exhaust ports, a piston reciprocable in said sleeve valve, means for admitting motive fluid for operating said piston, means effective toward the end of the working stroke of said piston for moving said sleeve to open said exhaust ports, and means effective toward the end of the return stroke of said piston for moving said sleeve to close said exhaust ports.

3. The combination of a cylinder, said cylinder having exhaust ports disposed therealong for substantially the full travel of said piston, a sleeve valve slidable within said cylinder for opening and closing said exhaust ports, a piston reciprocable within said sleeve valve means effective toward the end of the stroke of said piston for moving said sleeve valve for controlling said exhaust ports, and means providing for the escape of gaseous media from the non-working side of said piston when the exhaust ports are closed.

4. The combination of longitudinally arranged cylinders, each of said cylinders having exhaust ports disposed therealong for substantially the full travel of the piston associated therewith, a sleeve valve slidable within each cylinder for opening and closing the exhaust ports thereof, a single acting piston reciprocable in each sleeve valve, a bumper mounted on each piston for moving the sleeve valve associated therewith for controlling the exhaust ports, and means providing for substantially free and unrestricted communication between the sleeve valves.

5. The combination of longitudinally arranged cylinders, each of said cylinders having exhaust ports disposed therealong for substantially the full travel of the piston associated therewith, a sleeve valve slidable within each cylinder for opening and closing the exhaust ports thereof, a piston reciprocable in each sleeve valve, and a bumper mounted on each piston for moving the sleeve valve associated therewith for controlling the exhaust ports, and means for admitting pressure fluid for shifting the sleeve valves relative to the exhaust ports of the cylinders.

6. The combination with a cylinder provided with a plurality of inlet and exhaust ports and an intermediate head having a central aperture and one or more auxiliary apertures parallel to said first aperture, two sleeve valves, each provided with a plurality of discharge ports extending radially through a curved wall mounted to slide within said cylinder and rigidly connected to each other by means of a tubular member mounted within said central aperture of said intermediate cylinder head and a tubular connecting member in each auxiliary aperture, a common piston rod extending through said central tubular connecting member, a piston within each sleeve valve rigidly connected to said piston rod, and bumpers mounted on said piston rod for shifting said sleeve valves when a piston reaches the end of a stroke.

LESLIE J. DUFFY.